UNITED STATES PATENT OFFICE.

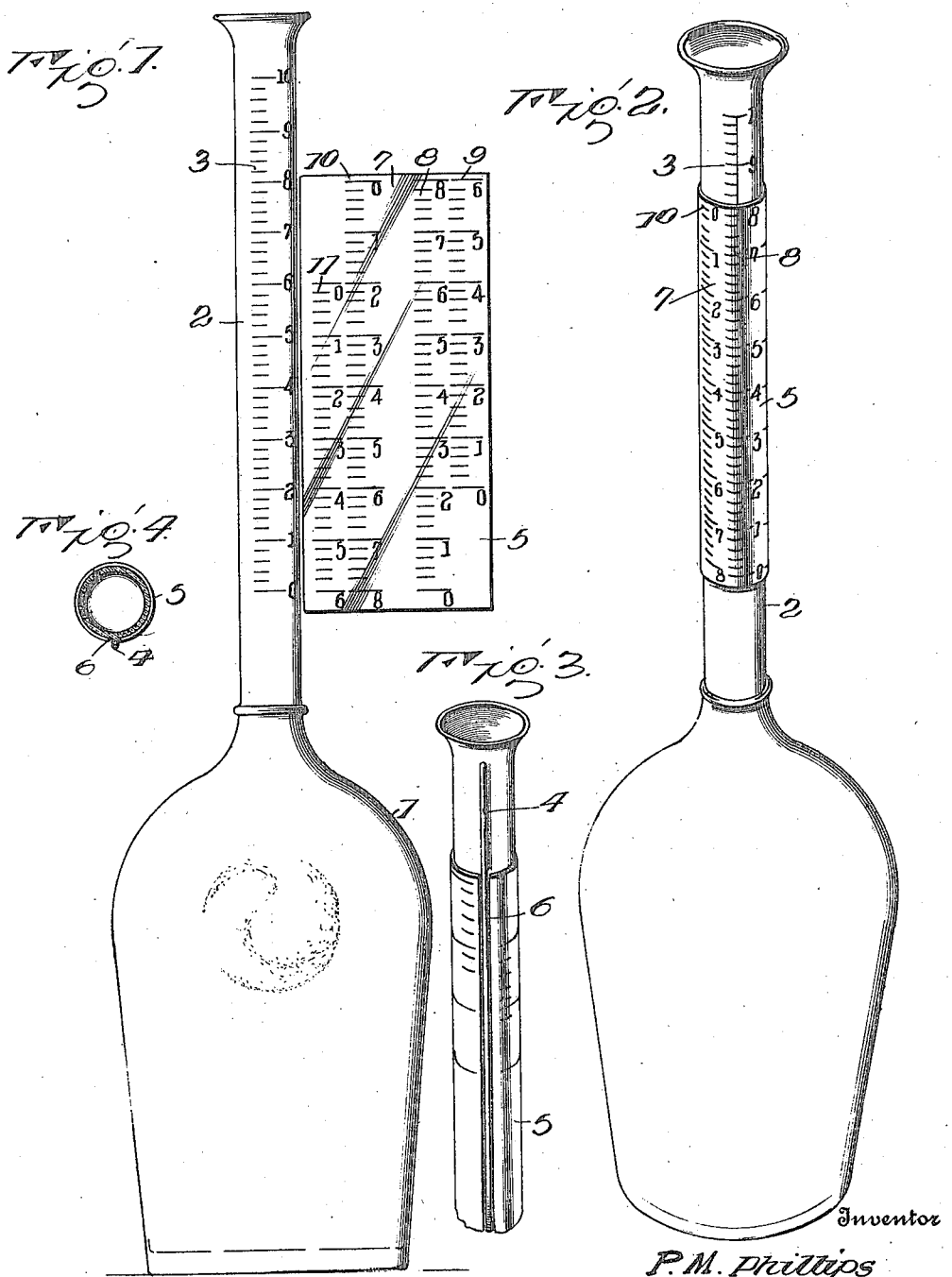

PAUL M. PHILLIPS, OF WESTBORO, MASSACHUSETTS.

MILK-TESTER.

1,158,275.   Specification of Letters Patent.   Patented Oct. 26, 1915.

Application filed January 14, 1914. Serial No. 812,095.

*To all whom it may concern:*

Be it known that I, PAUL M. PHILLIPS, citizen of the United States, residing at Westboro, in the county of Worcester and State of Massachusetts, have invented certain new and useful Improvements in Milk-Testers, of which the following is a specification.

This invention relates to milk testers, and more particularly to an attachment for the well known Babcock milk tester. A disadvantage possessed by the Babcock milk tester is that should the level of the cream or butter fat in the neck of the tester be above or below the scale thereon, dividers must be employed for the purpose of determining the percentage of butter fat. It is also necessary to employ dividers if the level or upper end of the column of butter fat is located at some point in the length of the scale and the lower end of the column is located below the zero mark of the scale. It will be apparent of course that when it is necessary to resort to the use of dividers, the utility of the tester is in part destroyed. It is therefore an aim of the present invention to provide an attachment for the neck of a Babcock milk tester, by the use of which attachment the percentage of butter fat or cream may be readily and accurately determined regardless of the height of the column of butter fat or cream or the location of the ends of the column.

In the accompanying drawings: Figure 1 is a view in elevation of a Babcock milk tester, illustrating also diagrammatically or in flattened out condition the attachment embodying the present invention. Fig. 2 is a perspective view of the invention applied to the neck or tube of the milk tester. Fig. 3 is a view similar to Fig. 2 but looking at the other side of the attachment. Fig. 4 is a horizontal sectional view through the attachment and the tube of the tester.

Corresponding and like parts are referred to in the following description and indicated in all the views of the drawings by the same reference characters.

In the drawings, the numeral 1 indicates the body of a milk tester of the well known Babcock type and 2 the neck or tube thereof, which latter is cylindrical and provided exteriorly with a scale 3, the marks of which indicate in connection with the level of the butter fat or cream in the tube, the percentage of butter fat or cream within the contents of the tester. For a purpose to be presently explained, the tube 2 is formed with a longitudinally extending rib 4 preferably located at that side of the tube diametrically opposite the side upon which the scale 3 is located.

The attachment embodying the present invention is preferably formed from transparent celluloid, although any other transparent material which is more or less flexible and yet resilient to a certain degree may be employed. The attachment is in the form of a split sleeve 5, the sleeve being of a diameter to snugly fit the tube 2 with the slit, indicated at 6, receiving the rib 4 in the manner clearly shown in Figs. 3 and 4 of the drawings.

At its side opposite the side at which the slit 6 is located, the sleeve 5 is clear or free from marks throughout a vertically extending space 7, and when the attachment is fitted to the tube 2 the scale 3 may be found through the portion 7 of the sleeve practically with the same ease as if the sleeve were not present.

At one side of the space 7, the sleeve 5 is provided with a scale 8 and a scale 9, these scales being located beside each other, and the scale 8 having its numerals arranged in ascending order from "zero" to "8," for example, and the scale 9 having its numerals arranged also in ascending order and ranging from "zero" to "6," the zero mark of the scale 9 being located opposite the "2" mark of the scale 8. The sleeve at the opposite side of the space 7 is marked with scales 10 and 11, the numerals of the scale 10 being arranged in descending order and ranging from "zero" to "8," and the numerals of the scale 11 being also arranged in descending order and ranging from "zero" to "6," the zero mark of the scale 11 being located opposite the "2" mark of the scale 10. The graduations of the scales 8, 9, 10 and 11 correspond in degree to those of the scale 3, that is to say, the distance between any two major graduations of any of the scales 8, 9, 10 and 11 is the same as the distance between any corresponding two major graduations of the scale 3, and the minor graduations in all the scales likewise correspond in degree. As stated above, the rib 4 projects into the slit 6 and consequently the sleeve is held against turning upon the tube 2, although it may be slid up and down upon the said tube, and it is preferable that the sleeve be so formed as to snugly and frictionally embrace the tube so that it will be supported at any position to which it is adjusted.

In the use of the tester without the attachment should the column of butter fat or cream extend, for example, between the scale marks 4 and 8 of the scale 3 without the provision of the attachment, it would be necessary to subtract one numeral from the other in order to determine the scale mark with which the upper end of the column would register if the lower end registered with the zero mark. On the other hand, should the lower end of the column of butter fat or cream be located below the zero mark of the scale 3 and its upper end should be located at some point in the series of scale marks, it would be necessary to measure the height of the column by a pair of dividers and then place the points of the dividers upon the scale 3 in order to determine with which of the scale marks the upper end of the column would register if the lower end would register with the zero mark. The use of dividers must be resorted to also if the upper end of the column of butter fat or cream is located above the uppermost one of the scale marks. With the use of the attachment, however, assuming that the lower end of the column is located a little above the scale mark 1 of the scale 3 and the upper end of the column is located a little below the scale mark 8, the attachment is slid up or down upon the scale or tube 2 until the zero mark of the scale 8 or the scale 9 registers with the lower end of the column whereupon a direct reading of the percentage of butter fat or cream may be had by noting the location of the upper end of the column with relation to the corresponding scale. On the other hand, should the upper end of the column be located above the upper end of the scale 3, the attachment may be slid upwardly upon the tube 2 until the zero mark of the scale 10 or 11 registers with the said upper end of the column, whereupon a reading of the tester may be taken by noting the location of the lower end of the column with relation to the respective scale 10 or 11. In the first instance, the scale 8 will be more frequently employed and in the latter instance the scale 10, the scales 9 and 11 being employed in cases where the upper and lower ends of the column of the butter fat or cream are located between the ends of the scale 3.

Having thus described the invention, what is claimed as new is:—

1. In a device of the class described, an open ended tubular member arranged for application to the tube of a milk tester in a manner to provide for sliding movement of the member upon the said tube, said member having scales thereon respectively arranged in ascending and descending order.

2. In a device of the class described, a split sleeve open at both ends and arranged for application to the tube of a milk tester in a manner to provide for sliding movement of the sleeve upon the said tube, the sleeve having scales marked thereon respectively in ascending and descending order.

3. In a device of the class described, a split sleeve of transparent material designed for application to the tube of a milk tester in a manner to provide for sliding movement of the sleeve upon the said tube, the said sleeve having scales marked thereon and respectively arranged in ascending and descending order.

4. The combination with the tube of a milk tester, said tube being provided with a projection, of a sleeve fitted upon the tube and slit to receive the projection, the said sleeve being provided with a scale.

5. The combination with the tube of a milk tester, of a split sleeve of transparent material fitted thereon, the said tube being provided with a projection engaging in the slit in the sleeve, and the said sleeve being provided with a scale.

6. In a device of the class described, a sleeve having sets of scales thereon arranged respectively in ascending and descending order, the scales of the set which are arranged in ascending order being located beside each other, as are also the scales of the set which are arranged in descending order, and the scales of each set having registering non corresponding scale marks.

In testimony whereof I affix my signature in presence of two witnesses.

PAUL M. PHILLIPS. [L. S.]

Witnesses:
J. F. COOKSON,
EVELYN M. COOKSON.